United States Patent [19]
August

[11] Patent Number: 5,279,199
[45] Date of Patent: Jan. 18, 1994

[54] TECHNIQUE AND APPARATUS FOR REARWARD LAUNCH OF A MISSILE

[75] Inventor: Henry August, Chatsworth, Calif.

[73] Assignee: Hughes Aircraft Company, Los Angeles, Calif.

[21] Appl. No.: 929,356

[22] Filed: Aug. 14, 1992

[51] Int. Cl.$^5$ .............................. F41F 3/06; B64D 1/04
[52] U.S. Cl. .................................. 89/1.51; 89/1.816; 89/1.818; 102/351; 102/357
[58] Field of Search ............... 89/1.816, 1.818, 1.815, 89/1.701, 1.57, 1.51, 1.8, 1.14; 102/342, 351, 357, 530, 531

[56] References Cited

U.S. PATENT DOCUMENTS

| | | | |
|---|---|---|---|
| 3,547,000 | 12/1970 | Haberkorn | 89/1.8 |
| 3,611,865 | 10/1971 | Schallert | 89/1.51 |
| 3,800,656 | 4/1974 | Schnäbele | 89/1.701 |
| 4,474,101 | 10/1984 | Boulard et al. | 89/1.51 |
| 4,494,437 | 1/1985 | von Maydell | 89/1.51 |
| 4,520,975 | 6/1985 | Blackhurst | 89/1.51 |
| 4,522,104 | 6/1985 | Degen | 89/1.51 |
| 4,714,020 | 12/1987 | Hertsgaard et al. | 102/351 |
| 4,938,115 | 7/1990 | von Maydell | 89/1.51 |
| 4,944,210 | 7/1990 | Flock et al. | 89/1.818 |

*Primary Examiner*—David H. Brown
*Attorney, Agent, or Firm*—Charles D. Brown; Randall M. Heald; Wanda K. Denson-Low

[57] ABSTRACT

A technique and apparatus for rearward launch of a missile. The inventive apparatus (10) includes a launch tube (12) in which the missile (14) is mounted with the forward end of the missile being mounted at the forward end (16) of the tube. The rearward end of the launch tube is sealed with a break-away material (18) prior to expulsion of the missile (14). An expulsion mechanism expels the missile in a rearward direction from the launch tube. The expulsion mechanism includes an airbag (20) and a pressurization mechanism (30). The airbag (20) includes a bra (22) for maintaining the orientation of the missile (14) during the expulsion thereof. The airbag (20) also includes a metallized enclosure (24) for sealing the launch tube (14) after the expulsion of the missile (14).

7 Claims, 3 Drawing Sheets

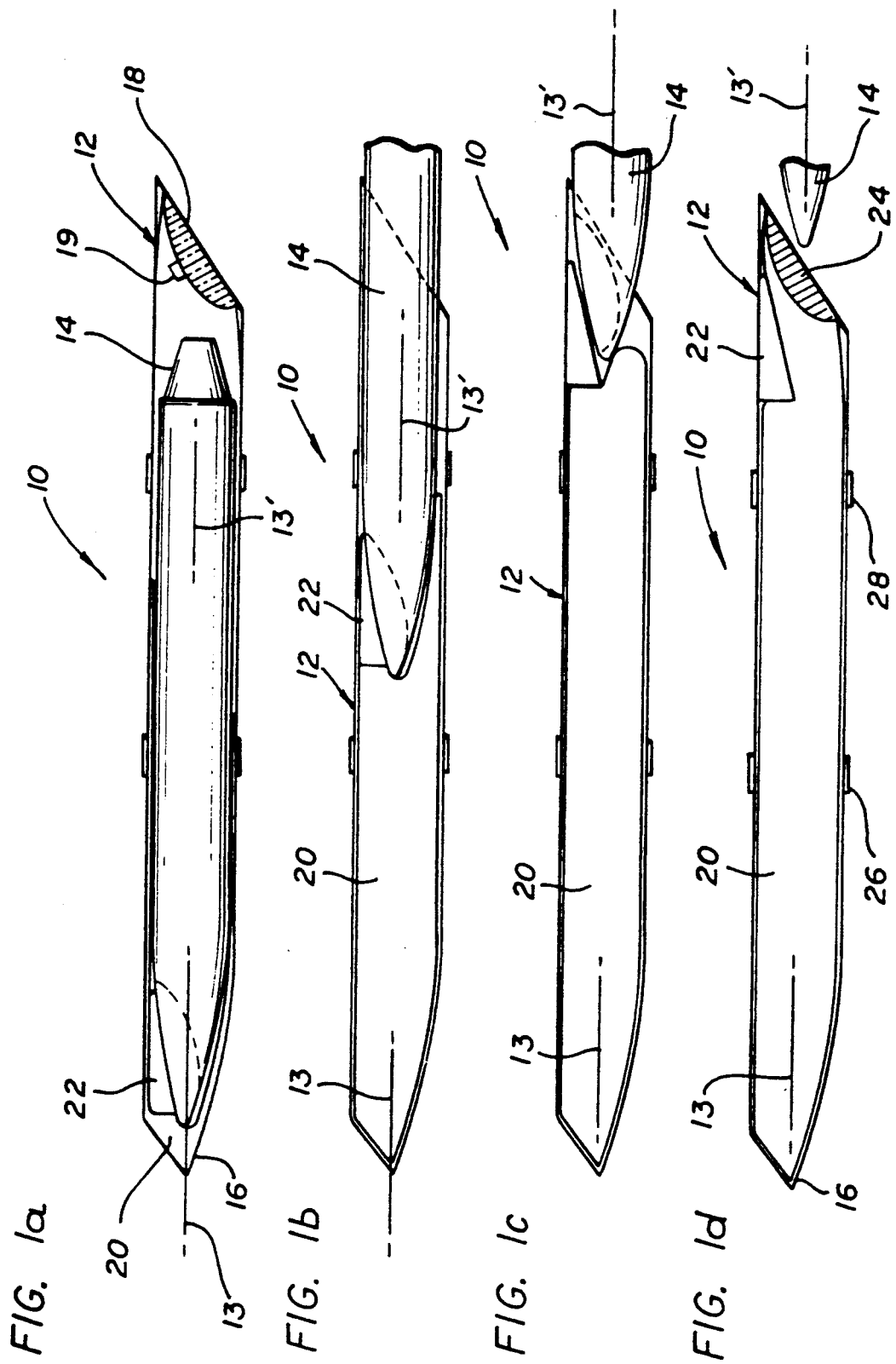

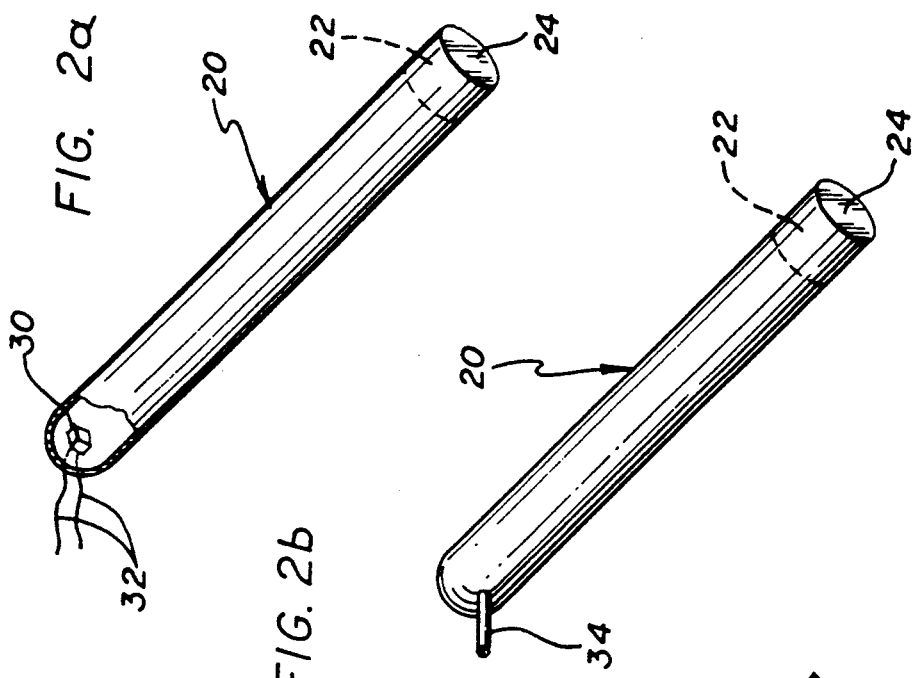
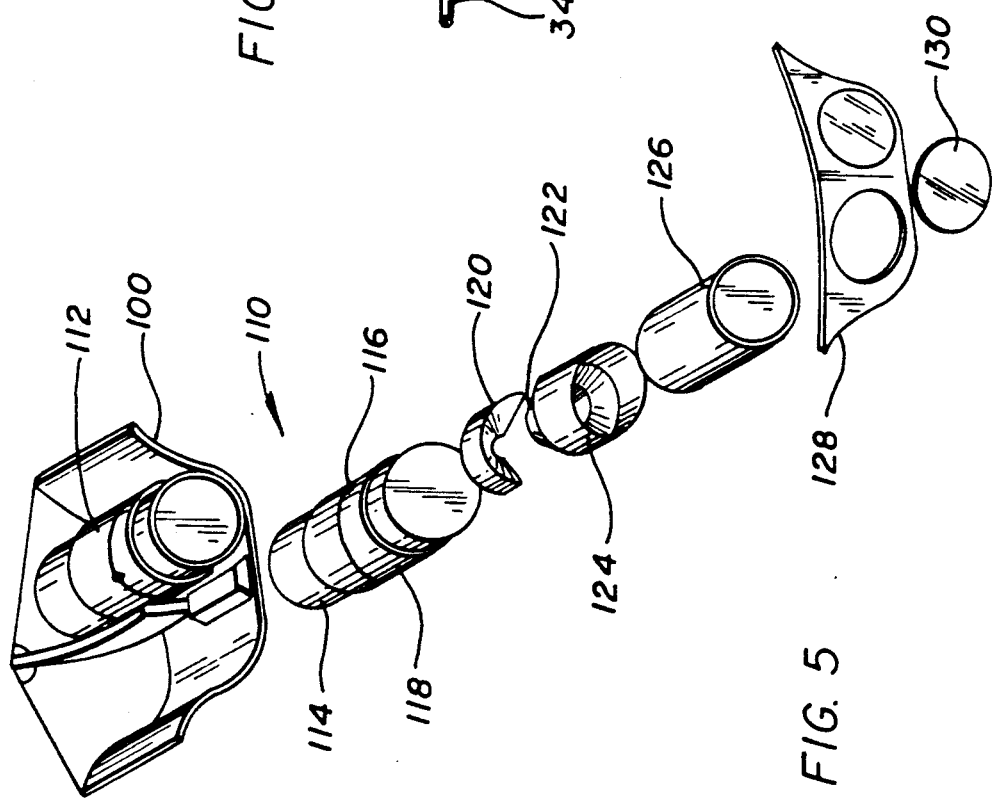

TECHNIQUE AND APPARATUS FOR REARWARD LAUNCH OF A MISSILE

BACKGROUND OF THE INVENTION

1. Field of the Invention

The present invention relates to missile systems. More specifically, the present invention relates to methods and apparatus for launching missiles.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Two important considerations in the design of military aircraft are aerodynamic drag and radar profile. These considerations operate to impose certain constraints on the method and apparatus for launching missiles from such craft. Current missile launch techniques from pods or air vehicles utilize bay doors or a forward port release.

Bay doors are used in applications where the missile is stored internal to the aircraft. However, this option is generally deemed undesirable in that the internal storage of such weapons increases the size of the aircraft. The increased size causes a corresponding increase in the aerodynamic drag, radar profile, weight and cost of the vehicle.

As a result, many designers opt to store missile weaponry external to the aircraft in launch tubes for which the forward port release is the launch technique. With this technique, the missile is ejected in a forward direction from the tube relative to the direction of motion of the aircraft. In this case, high drag and high forward radar reflectivity result.

In addition, tail extension must be delayed until the missile clears the tube. Consequently, the missile is unstable in its initial flight and its tail surfaces must be rapidly deployed and locked to avoid weapon/aircraft collision.

Thus, there is a need in the art for a low drag, low profile, low cost missile launch technique which enhances the safe separation of the missile from the aircraft as well as the survivability of the aircraft.

SUMMARY OF THE INVENTION

The need in the art is addressed by the technique and apparatus for rearward launch of a missile of the present invention. The apparatus of the invention is adapted for use with a missile having a forward end and an aft end. The inventive apparatus includes a launch tube in which the missile is mounted with the forward end of the missile being mounted at the forward end of the tube. An expulsion mechanism is included for expelling the missile in a rearward direction from the launch tube.

In a particular implementation, the rearward end of the launch tube is sealed with a break-away material (e.g., frangible glass) prior to expulsion of the missile. The expulsion mechanism includes an airbag and a pressurization mechanism. The airbag includes a bra for maintaining the orientation of the missile during the expulsion thereof from the launch tube. The airbag also includes a metallized enclosure for sealing the launch tube after the expulsion of the missile.

BRIEF DESCRIPTION OF THE INVENTION

FIGS. 1a–1d show sectional side views of the rearward launch apparatus of the present invention with the missile in various stages of deployment.

FIG. 2a is a top perspective view of the airbag of the present invention fully deployed and partially cut-away to reveal the inflation mechanism thereof.

FIG. 2b is an end perspective view of the airbag of the present invention fully deployed.

FIG. 5 illustrates, in a disassembled view, a pod installation of a rearward tube-launched missile in accordance with the present teachings.

DESCRIPTION OF THE INVENTION

Figure 3:
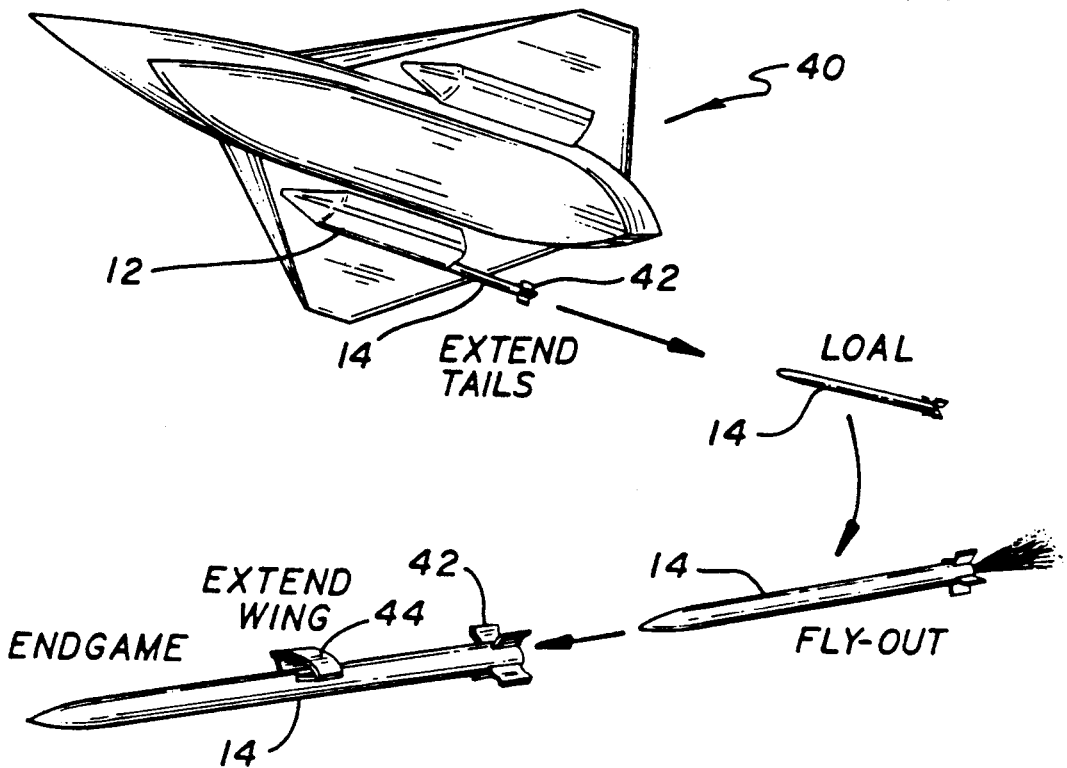
FIG. 3 depicts the flight path of a missile launched from the rear of an aircraft as taught by the present disclosure.

Illustrative embodiments and exemplary applications will now be described with reference to the accompanying drawings to disclose the advantageous teachings of the present invention.

FIGS. 1a–1d show sectional side views of the rearward launch apparatus of the present invention with the missile in various stages of deployment. The apparatus 10 consists of missile launch tube 12 of conventional construction in which a conventional missile 14 is disposed. The launch tube 12 is a generally cylindrical tube of metal or other suitable material. The launch tube has a longitudinal axis 13 along which the longitudinal axis 13' of the missile 14 is aligned. The forward end 16 of the launch tube 12 is closed and shaped in accordance with aerodynamic and radar profile considerations as is common in the art. The rearward end of the launch tube is sealed with a break-away membrane 18 such as frangible glass. Those skilled in the art will appreciate that the teachings of the invention may be exploited with other membranes sealing the aft end of the launch tube or with the aft (rearward) end of the launch tube being left open. When deployment is initiated, a breaker device 19 (such as a small explosive charge) is activated which breaks the membrane 18.

In accordance with the present teachings, an airbag 20 is disposed in the forward end of the launch tube 12 between the closed end 16 of the launch tube and the nose of the missile 14. The airbag 20 is a substantially sealed bag of flexible material such as rubber, mylar or aluminum foil.

A missile nose bra 22 of semi rigid material is positioned within the airbag 20 in a 200° arc over the nose of the missile 14. The nose bra 22 ensures that the missile will not rotate about a transverse axis on expulsion from the tube 12. This maintains the longitudinal axis of the missile 13' coextensive with the longitudinal axis 13 of the launch tube along the centerline thereof. This ensures a smooth deployment with minimal initial missile instability in that it constrains pitch-up of the forebody of the missile as the center of gravity of the missile travels beyond the launch tube.

Missile deployment is depicted in FIGS. 1a–1b which show the missile at 0%, 50%, 95% and 100% stages of deployment, respectively. As depicted in FIG. 1d, on full deployment of the missile 14 from the tube 12, the pressurized airbag fills the volume of the tube and a metallized membrane 24 mounted on the exterior surface of the airbag 20 seals the launch tube 12. The metallized membrane 24 serves to minimize radar returns. The metallized membrane 24 may be foil or other suitable material. Mounting brackets 26 and 28 facilitate attachment of the tube 12 to a vehicle in accordance with conventional teachings.

FIG. 2a is a top perspective view of the airbag 20 of the present invention fully deployed and partially cutaway to reveal the inflation mechanism 30 thereof. The airbag 20 may be designed and constructed using conventional teachings currently employed in the automobile industry. The invention is not limited to the technique employed to inflate the airbag. In FIG. 2a, a small amount of solid fuel 30 is disposed in the airbag and ignited by an electrical signal supplied over wires 32 by launch circuitry disposed on the host aircraft (not shown).

FIG. 2b is an end perspective view of the airbag 20 of the present invention fully deployed. In FIG. 2b, a tube 34 is shown for inflating the airbag 20 with gas pressure supplied by the host vehicle. In accordance with the illustrative implementation, with 10 pounds per square inch of pressure supplied by the airbag 20, a 1000 pound missile may be expelled at 30 feet per second.

FIG. 3 depicts the flight path of a missile launched from an aircraft as taught by the present disclosure. Rearward launch of the missile 14 is achieved from a low drag/low radar cross section tube 12 carried by an aircraft 40.

A particularly advantageous aspect of the present invention is that it allows for extension of the missile tail surfaces 42 prior to release of the missile 14. This allows for the launch of an aerodynamically stable missile without increasing the drag and radar cross section of the aircraft's launch tube 12.

After deployment from the aircraft 40, the missile enters "lock on after launch" (LOAL) mode, powers up, flies out, and extends a wing 44 for greater maneuverability as it flies to the target.

Figure 4:
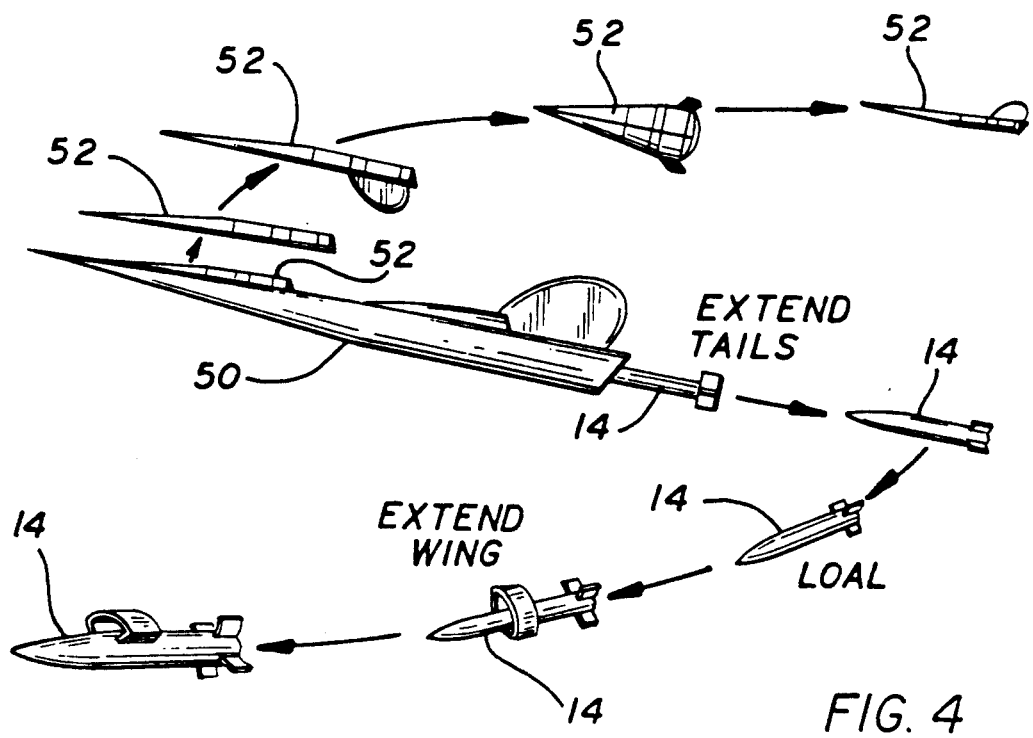
FIG. 4 illustrates an application of the present teachings in which a first missile is deployed from the rear of a second missile and the deployment of a third missile from the front thereof.

FIG. 4 illustrates an application of the present teachings in which a first missile 14 is deployed from the rear of a second missile 50 while a third missile 52 is deployed from the front portion thereof.

FIG. 5 illustrates a pod installation of a rearward tube-launched missile in accordance with the present teachings. The pod 100 is adapted to store first and second missile tube assemblies 110 and 112. Each assembly includes a tube 114 which is supported by a hanger 116 and a support ring 118. In accordance with the present teachings, a sabot 120 and folding panel 122 support an air bladder 124 inside the tube 114. The missile is disposed within the tube 114 between the air bladder 124 and a pod aft section 128. The pod aft section is closed off with a frangible cover 130.

Thus, the present invention has been described herein with reference to a particular embodiment for a particular application. Those having ordinary skill in the art and access to the present teachings will recognize additional modifications applications and embodiments within the scope thereof. For example, the invention is not limited to aircraft applications. The present teachings may be employed for other vehicles including submarines and surface ships. In addition, the invention is not limited to the technique employed for expelling the missile. Other may be employed as may be appreciated by those skilled in the art.

It is therefore intended by the appended claims to cover any and all such applications, modifications and embodiments within the scope of the present invention.

Accordingly,

What is claimed is:

1. Apparatus for rearward launch of a missile having a forward end and an aft end, said apparatus comprising:
   a launch tube in which the missile is mounted with the forward end of the missile being mounted at the forward end of the tube:
   means for expelling the missile in a rearward direction from the launch tube said means for expelling including:
   i. an airbag:
   ii means for pressurizing said airbag: and
   bra means for maintaining the orientation of said missile during the expulsion thereof from the launch tube.

2. The invention of claim 1 wherein said bra means is located within said airbag.

3. The invention of claim 1 wherein said airbag includes a metallized enclosure for sealing said launch tube after the expulsion of said missile.

4. The invention of claim 1 wherein the missile is enclosed within said launch tube.

5. The invention of claim 4 wherein the rearward end of the launch tube is sealed with a break-away material prior to expulsion of the missile.

6. The invention of claim 5 wherein the break-away material is frangible glass.

7. Apparatus for rearward launch of a missile having a forward end and an aft end, said apparatus comprising:
   a launch tube in which the missile is enclosed the forward end of the missile being mounted at the forward end of the tube, the rearward end of the launch tube being sealed with a break-away material prior to launch of the missile and
   means for expelling the missile in a rearward direction from the launch tube, including an airbag and means for pressurizing said airbag, said airbag including bra means for maintaining the orientation of said missile during the expulsion thereof from the launch tube and a metallized enclosure for sealing said launch tube after the expulsion of said missile.

* * * * *